United States Patent [19]

Volk, Jr.

[11] Patent Number: 5,141,135
[45] Date of Patent: Aug. 25, 1992

[54] BRACKET ASSEMBLY FOR AGITATING A BAG CONTAINING BULK DRY MATERIAL

[75] Inventor: Joseph A. Volk, Jr., Creve Coeur, Mo.

[73] Assignee: Beta Raven Inc., Earth City, Mo.

[21] Appl. No.: 629,157

[22] Filed: Dec. 18, 1990

[51] Int. Cl.⁵ .............................................. B65D 35/56
[52] U.S. Cl. .................................... 222/105; 222/181; 222/203; 414/415
[58] Field of Search ............... 222/95, 105, 181, 185, 222/199, 198, 203, 202; 414/415, 304

[56] References Cited

U.S. PATENT DOCUMENTS

| | | | |
|---|---|---|---|
| 4,143,796 | 3/1979 | Williamson et al. | 222/185 |
| 4,273,266 | 6/1981 | Snape | 222/203 X |
| 4,810,156 | 3/1989 | Pendleton et al. | 222/203 X |

FOREIGN PATENT DOCUMENTS

| | | | |
|---|---|---|---|
| 623793 | 9/1978 | U.S.S.R. | 222/203 |
| 668850 | 6/1979 | U.S.S.R. | 222/203 |
| 742307 | 7/1980 | U.S.S.R. | 222/203 |
| 2084968 | 4/1982 | United Kingdom | 222/198 |

Primary Examiner—Gregory L. Huson
Attorney, Agent, or Firm—Rogers, Howell & Haferkamp

[57] ABSTRACT

A pivotally mounted U-shaped bracket assembly is disposed beneath the bottom of a bag containing a quantity of bulk dry material and surrounding a pourspout in the bottom of the bag. An air cylinder comprising an inflatable bladder positioned opposite the pivotal mount of the bracket selectively pushes the bracket upwardly into the bottom of the bag to dislodge the dry material and separate it into its original granulated or powdered form and break up any agglomerations or solidifications thereof which would otherwise interfere with the free flow of dry material from within the bag and through the pourspout. A vibrator is vertically mounted on the outboard end of the bracket and introduces vibratory forces into the material as the bracket deflects the bag to further aid the free flow of material.

25 Claims, 3 Drawing Sheets

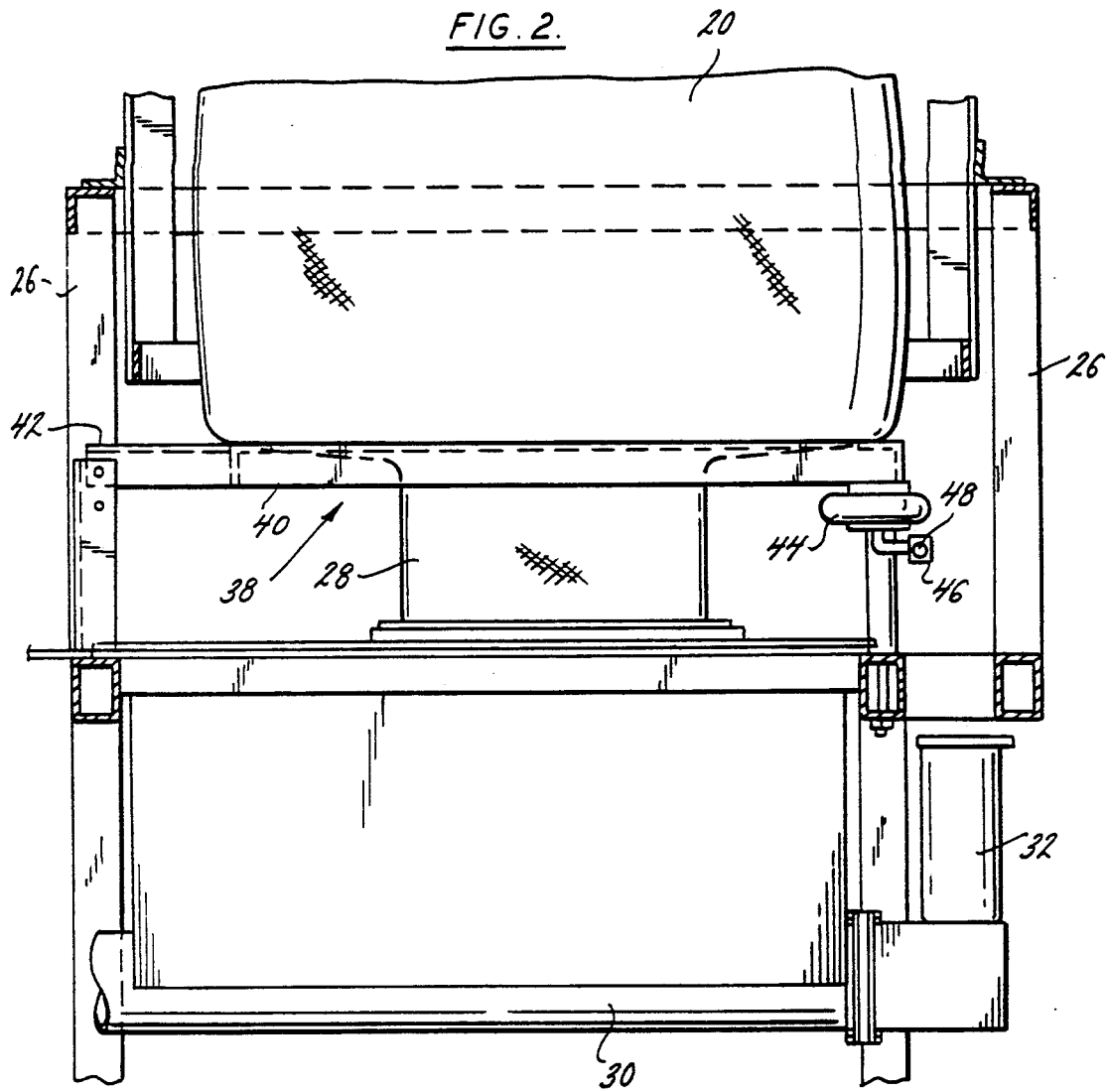
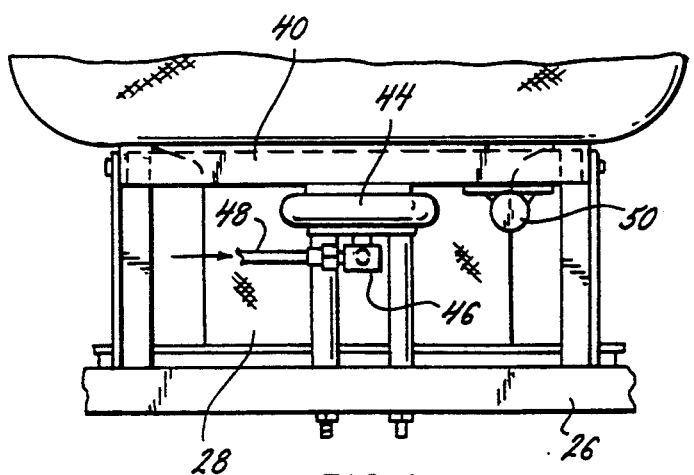

BRACKET ASSEMBLY FOR AGITATING A BAG CONTAINING BULK DRY MATERIAL

BACKGROUND AND SUMMARY OF THE INVENTION

There are many processes which utilize dry material which is stored in bulk and fed from a bulk container by a screw conveyor, auger, or the like, for batch processing, for example. Recently, large bags have been developed for use in transporting measured quantities of dry material. Generally, in the prior art, this dry material is emptied from the bulk bags into storage bins or feeder bins, and the material is then augered from these feed bins into the process, as desired. Although these bulk bags would otherwise be suitable for rack mounting and direct feeding therefrom, there is an inherent problem with many dry materials that inhibits a bulk bag's use in that manner. Some of these problems include the tendency for the dry material to absorb moisture from the humidity in the air and partially solidify within the bag to thereby impede the free flow of dry material from a pourspout or the like which is often conveniently built into the bottom of bulk bags. This is sometimes referred to as bridging or rat holing. This partial solidification may also be caused merely by the passage of time as the bags are transported or sit awaiting use. Furthermore, a bag may be mounted in a rack and the material adequately loosened to flow freely initially, but the material may then agglomerate or otherwise compact or obstruct the pourspout such that an even, reliable flow of material from the bag until empty is difficult to achieve.

The inventor herein is aware of attempts in the prior art to solve this problem. As best understood, one such prior art attempt consists of a generally rectangular bracket member which is pivotally mounted, much as a child's teeter-totter, and formed in a cradle-like shape. A motor with an eccentric or the like is coupled to an outboard end of the rectangular bracket and used to oscillate the bracket against the bottom of the bag. Because the bag's pourspout has to be loosened and fitted into a surge hopper, the bracket member is initially retracted below the surge hopper and then cranked upwardly into position after the bag is lifted into position above the surge hopper and its pourspout fitted in place. This procedure is necessary to allow unrestricted access to the pourspout for initially loosening it and aligning it with the surge hopper.

While this may improve the flow of material from within the bag, it is not viewed as a complete solution in that the force exerted against the bag is limited to an oscillating teeter-totter motion with a restricted range of movement "into" the bag bottom. Thus, the forced movement of the material in the bag which would have a tendency to break up these agglomerations or partial solidifications is necessarily restricted. Perhaps because of this restricted movement, the prior art teaches the use of a second stage of agitation in the surge hopper, after the dry material has left the bag, to ensure a smooth flow of dry material. In other words, the prior art uses not only the oscillating bracket to agitate the material in the bag, but also a surge hopper with its own agitation mechanism to ensure a reliably loose material suitable for smooth flow such as by augering or the like.

In order to solve these and other problems in the prior art, the inventor herein has succeeded in designing and developing a bracket arrangement as the single agitation mechanism for feeding dry material directly from bags. The bracket is selectively activated whenever flow is called for to physically knead the lower portion of the bag and the dry material adjacent the pourspout which provides a significant improvement in loosening the dry material just before it exits the bag. Additionally, a vibrator may be mounted on the bracket in order to not only deflect the bag bottom but also vibrate it. The inventor's bracket does not just oscillate in a limited range of motion, but it pushes radically upward into the bag as it is pivoted at one end thereof and not in its middle as in the prior art. Also, the control for the bracket assembly can be used to push against the lower portion of the bag once, twice, or repeatedly during the course of material discharge. With different kinds of dry materials, one or more of these different operating routines may be used to best effect.

The bracket assembly essentially consists of a U-shaped bracket which is pivotally mounted beneath the bag at the ends of the legs of the U, and an air cylinder which supports the closed end of the U from the surrounding framework. This U-shaped design and its mounting allow free access to the bag bottom and its pourspout after it has been mounted onto the framework and does not require the crank mechanism for raising the bracket from a lowered position as suggested by the prior art. As the bulk bags in the inventor's system may be arranged in banks, a walkway adjacent one side of the bag and the open end of the U-shaped bracket permits an operator to have free and ready access to the bag bottoms for purposes of unfolding the pourspout where it is secured for storage in shipping purposes, and inserting the pourspout into a downspout or other feed arrangement as is known in the art to provide a ready path for dry material as it exits the bag.

The U-shaped bracket substantially surrounds the pourspout and engages the bottom of the bag which is the portion of the bag closest to the material which immediately exits therefrom and therefore is positioned for maximum effect. The vibrator is positioned on the portion of the U-bracket which engages the bag bottom and is vertically oriented to thereby be maximally coupled to the dry material. The air cylinder is of the rubber bladder inflation type thus permitting the vibrator to be effective by inducing vibrations into the bag through the soft coupling between the U-shaped bracket and the frame. The travel of the U-shaped bracket may be adjusted by physically changing the mounting location of the bracket, and by choosing an air cylinder having a different inflation extension. The U-shape design and movement of the bracket from these positions allow for maximum effectiveness in agitating the dry material while eliminating obstruction of the pourspout.

While the principal advantages and features of the present invention have been briefly described above, a greater understanding of the invention may be attained by referring to the drawings and description of the preferred embodiment which follow.

BRIEF DESCRIPTION OF THE DRAWINGS

FIG. 2 is a partial cross-sectional view taken along the plane of line 2—2 in FIG. 1 and showing a side view of the bracket assembly and air cylinder; and FIG. 3 is an enlarged view of the air cylinder with a dump valve for rapid deflation thereof.

DETAILED DESCRIPTION OF THE PREFERRED EMBODIMENT

Figure 1:
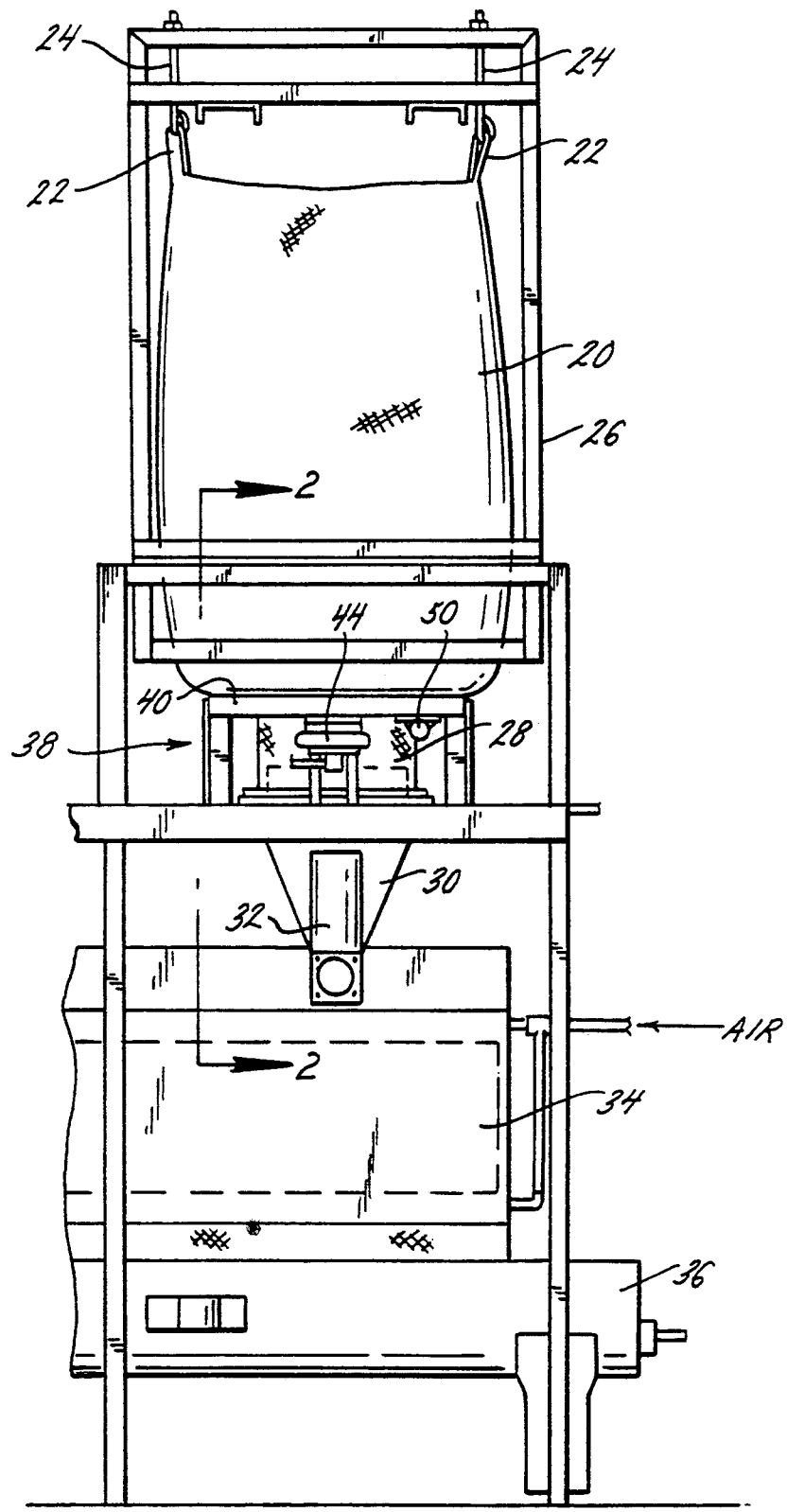
FIG. 1 is a side elevational view of a typical dry material feeder with a bulk bag secured to a framework and supported above an auger and weigh hopper.

As shown in FIG. 1, a bag 20 containing dry material in bulk form may be suspended near its top by a plurality of loops 22 which support the bag 20 from eyelet members 24 located near the four corners of the top of the bag 20. The eyelets 24 are themselves supported from a framework 26 such that the bag 20 and its dry material are supported above a discharge chute 28 through which dry material is fed into an auger 30 driven by a gear motor 32. Dry material exits the auger 30 into a weigh hopper 34 and is weighed in a batch before dumping into an air transfer conveyor 36 Commonly, a plurality of bags 20 are supported from the same framework 26 along a series of rows, each bag 20 having its own discharge chute 28 and auger 30 such that a plurality of materials may be dumped into the same weigh hopper 34 and batch weighed before being transferred by conveyor 36 where the batch is used in a food or chemical process.

Mounted beneath the bottom of bag 20 is the bracket assembly 38 of the present invention. The bracket assembly 38 includes a generally U-shaped bracket member 40 pivotally supported at its ends 42 from framework 26. Additional pivot holes 43 are provided to accommodate bags filled with material having differing densities For those bags filled with wheat gluten, for example, the bag might weigh as much as 2300 lb. and sag over the lip of discharge chute 28 much more than a bag filled with wheat bran which might weigh as little as 1000 lb. Thus, a 2"-3" difference in bag sag may be experienced which pivot holes 43 may thus adjust for to position the bracket member 40 immediately adjacent the bottom of bag 20. As best seen in FIGS. 2 and 3, the U-shaped bracket 40 substantially surrounds the pourspout (not shown) which extends from the center of the bottom of bag 20 into discharge chute 28. Furthermore, the U-shaped bracket 40 is arranged to contact the lower portion or bottom surface of bag 20. At the outboard end of bracket 40, or the end opposite the pivotal connections at the open ends 42, an air cylinder 44 is mounted thereto and extends between the bracket 40 and the frame assembly 26. Air cylinder 44 is preferably a rubber bladder inflatable type such as a Firestone air mount to provide a soft coupling between the bracket member 40 and framework 26. Other types of inflatable deflecting devices could be used, and perhaps even rigid deflecting devices although it is believed that the vibratory forces have a greater effect with a soft coupling between the bag 20 and bracket member 40. As best shown in FIG. 3, an air valve 46 is mounted in the air line 48 used to provide compressed air for filling the air cylinder 44. A vibrator 50 is mounted on the bracket portion adjacent air cylinder 44 and is vertically oriented to thereby introduce vibratory forces into the dry material as the bracket 40 is pushed upwardly into the bag 20.

Figure 4:
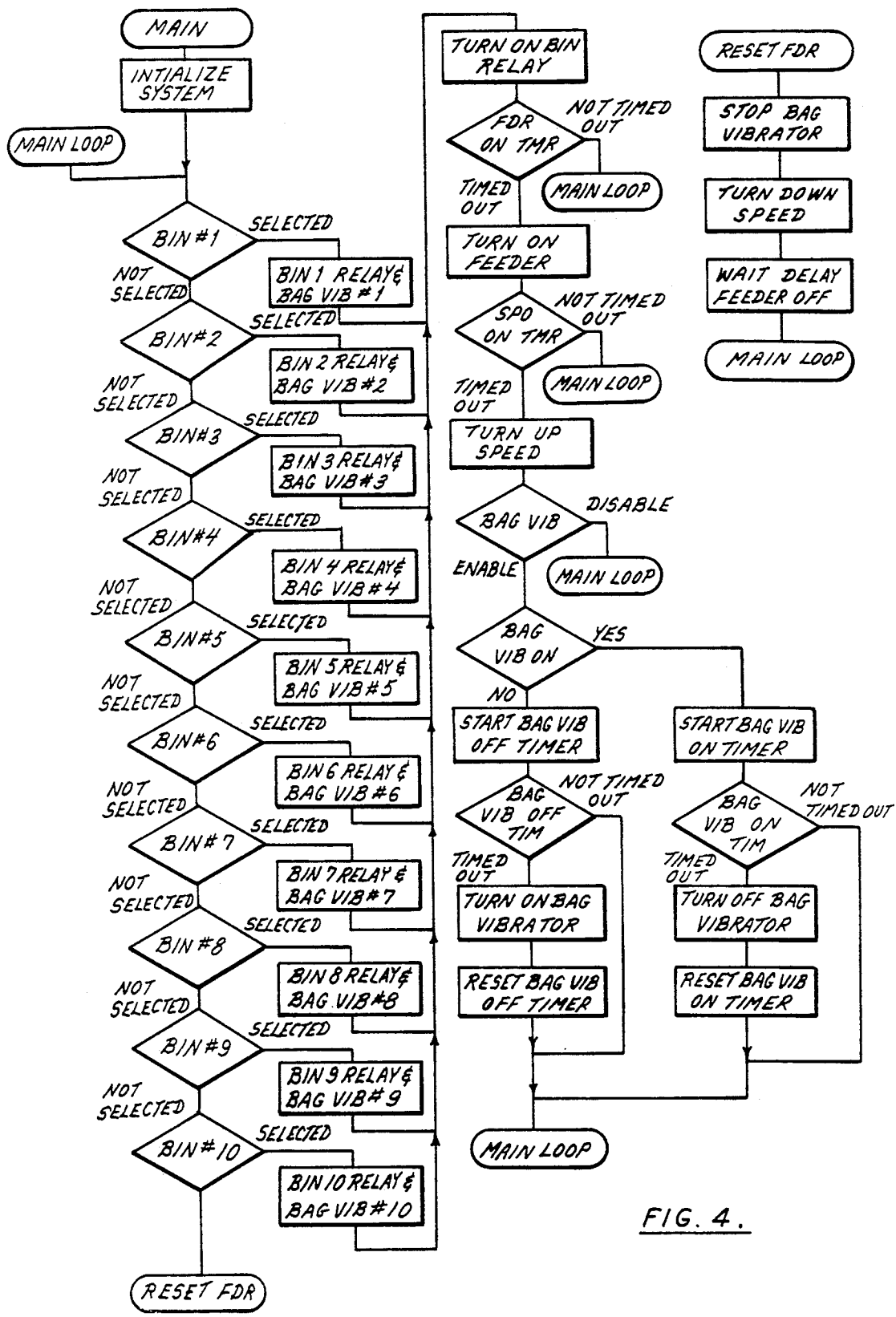
FIG. 4 is a flow diagram showing one example of a suitable software program used in control of the dry material feeder.

One example of a software program which can be used for a microprocessor (not shown) to control the inflation and deflation of the air cylinder 44 which pushes bracket 40 upwardly into the bottom surface of bag 20 is shown in FIG. 4. Up to ten bins may be racked on the same framework, with each bin having its own bag and associated bracket assembly. Upon selection of a particular bin for augering out dry material from its associated bag, the software program has a series of time delays to permit the feeder or auger to be turned on and come up to speed before the bracket assembly is actuated and its vibrator turned on to knead and vibrate the bottom of the bag. Two parallel loops are used with timers to control the on and off cycling of the air cylinder so that the bracket assembly may be operated in different modes corresponding to the particular material contained within the bag. For example, the bracket assembly may be just driven upwardly once and then returned to its original position. Still another example would be for the air cylinder to drive the bracket up and down repeatedly for longer draws of material from a bag. As would be apparent to those of ordinary skill in the art, the program shown on FIG. 4 is merely an example of several modes of operation which may be achieved. Other modes could be adopted in order to suit the material contained within the bag, feed rate, and other physical parameters. A test mode may also be provided to permit selective energization of each bracket in order to observe its operation for adjustment, etc.

As noted above, the bracket of the present invention is pivotally attached at one side and supported by an air cylinder at the other. Therefore, when the air cylinder is activated, the bracket is pushed upwardly into the bag bottom to substantially deflect it in a kneading action, and introduce vibration, which directly breaks apart any agglomeration. This increased travel and direct physical contact over virtually the entirety of the bag bottom yields reliable flow for the entire contents of the bag.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a device for feeding bulk dry material from a bag containing same, the device including means for supporting the bag above a spout or the like, the bag having a pourspout or the like generally centrally located in the bottom thereof through which the dry material is desirably discharged at a controlled rate into the spout, the improvement comprising means for deflecting the bag with respect to the bag support means to thereby agitate the dry material within the bag to improve its flow characteristics, said deflecting means being a substantially U-shaped, pivotally mounted bracket member mounted beneath the bottom of the bag that surrounds less than the entire circumference of the pourspout to thereby provide unimpeded access to the pourspout and spout, and means for selectively pivotally deflecting said bracket member upwardly against the bag bottom.

2. The device of claim 1 wherein the bracket deflecting means comprises means for selectively deflecting said bracket member upwardly against the bag bottom so as to elevate it substantially above its at rest position.

3. The device of claim 1 wherein the bracket deflecting means comprises an inflatable bladder.

4. The device of claim 1 wherein the bracket deflecting means comprises means for soft coupling the bracket member to the support means.

5. The device of claim 1 wherein the deflecting means comprises means for repeatedly deflecting said bracket member upwardly against the bag upon a single cycle of operation.

6. The device of claim 1 wherein the weight of the bag and material is carried substantially by the support means as the bag is deflected.

7. The device of claim 1 further comprising means for vibrating the bracket as it deflects the bag bottom.

8. The device of claim 1 further comprising means for adjusting the at rest position of the bracket member with respect to the bag bottom to thereby compensate for bag sagging.

9. The device of claim 8 wherein said bracket member adjusting means comprises a plurality of holes in the bag support means to which said bracket is pivoted.

10. The device of claim 1 wherein the bag is generally supported from its top, and the deflecting means comprises means for deflecting the bottom of the bag with respect to its top and the bag support means.

11. The device of claim 10 wherein the bracket deflecting means comprises an air cylinder.

12. The device of claim 11 further comprising an air valve connected in line with the air cylinder for relieving air pressure therefrom.

13. The device of claim 12 wherein the bracket member is substantially U-shaped, with the legs of the U bracket member being pivotally connected to the support means, and the air lifting device is mounted to the base of the U bracket member opposite from the pivotal connections and underneath the bracket member so that as the air lifting device is inflated, the base of the U bracket is pushed upwardly into the bag bottom.

14. In a device for feeding bulk dry material from a bag containing same, the device including means for supporting the bag above a spout or the like, the bag having a pourspout or the like generally centrally located in the bottom thereof through which the dry material is desirably discharged at a controlled rate into the spout, the improvement comprising a substantially U-shaped bracket member pivotally mounted beneath the bag surrounding less than the circumference of the pourspout to allow access to the spout and pourspout, and means for selectively pushing the bracket member to pivot upwardly into the bag bottom to thereby substantially deform it and work the material near the bag bottom to free it for smoother and more reliable flow through the pourspout.

15. The device of claim 14 wherein the pivotal mounts are securing the legs of the bracket member to the support means, and wherein the pushing means comprises an inflatable bladder mounted beneath the bracket member at a point opposite the pivotal mounts so that as the inflatable bladder is inflated the bracket member is pushed upwardly into the bag bottom.

16. The device of claim 15 further comprising an air valve in line with the inflatable bladder to selectively dump the air pressure rapidly from the inflatable bladder to thereby facilitate repeatedly pushing the bracket member into the bag.

17. The device of claim 16 further comprising a vibrator mounted to the bracket member.

18. The device of claim 17 further comprising means for adjusting the at rest position of the bracket member with respect to the bag bottom to thereby adjust for variable bag sagging.

19. In a bulk dry material feeder, the feeder including a framework, the bag containing bulk dry material, means for supporting the bag near its top from the framework, the bag having a pourspout located substantially at its bottom through which the dry material exits, the improvement comprising means for kneading the lower portion of the bag about said pourspout and the material therein to facilitate the free flow of material through the pourspout, said kneading means comprising a substantially U-shaped bracket pivotally mounted below said bag about less than the full circumference of the pourspout and means for selectively pivotally pushing the bracket into the bag, said bracket allowing free access to said pourspout.

20. The device of claim 19 wherein the bracket is pivotally mounted to the framework so that it substantially surrounds the pourspout as it is pushed into the bag.

21. The device of claim 20 further comprising a plurality of holes in the framework to which the bracket is mounted, said plurality of holes thereby providing adjustability in the at rest position of the bracket with respect to the bag bottom to thereby compensate for bag sagging.

22. The device of claim 20 further comprising a vibrator mounted to the bracket.

23. The device of claim 22 wherein the bracket pushing means comprises an air cylinder.

24. The device of claim 23 wherein the air cylinder is mounted between the framework and the bracket at a point opposite the pivotal mount.

25. The device of claim 24 wherein the air cylinder is an inflatable bladder to thereby provide a soft coupling between the bracket and the framework.

* * * * *